United States Patent
Lochhaas et al.

(10) Patent No.: US 7,214,740 B2
(45) Date of Patent: May 8, 2007

(54) FLUORINATED IONOMERS WITH REDUCED AMOUNTS OF CARBONYL END GROUPS

(75) Inventors: Kai H. Lochhaas, Neuoetting (DE); Klaus Hintzer, Kastl (DE); Steven J. Hamrock, Stillwater, MN (US); Michael A. Yandrasits, Hastings, MN (US)

(73) Assignee: 3M Innovative Properties Company, Saint Paul, MN (US)

(*) Notice: Subject to any disclaimer, the term of this patent is extended or adjusted under 35 U.S.C. 154(b) by 0 days.

(21) Appl. No.: 11/120,822

(22) Filed: May 3, 2005

(65) Prior Publication Data

US 2006/0252888 A1  Nov. 9, 2006

(51) Int. Cl.
C08G 2/00      (2006.01)
C08L 11/02     (2006.01)
H01M 6/16      (2006.01)
C25B 13/08     (2006.01)
C08F 14/18     (2006.01)
C08F 114/18    (2006.01)
C08J 3/28      (2006.01)

(52) U.S. Cl. .................. 525/326.2; 522/1; 524/835; 524/805; 524/817

(58) Field of Classification Search ............. 525/326.2; 522/1; 524/805, 817
See application file for complete search history.

(56) References Cited

U.S. PATENT DOCUMENTS

| | | | |
|---|---|---|---|
| 3,085,083 A | 4/1963 | Schreyer | |
| 3,467,636 A | 9/1969 | Nersasian | |
| 4,742,122 A | 5/1988 | Buckmaster et al. | |
| 4,743,658 A | 5/1988 | Imbalzano et al. | |
| 4,940,525 A * | 7/1990 | Ezzell et al. ................ | 204/252 |
| 5,173,553 A | 12/1992 | Albano et al. | |
| 5,285,002 A | 2/1994 | Grootaert | |
| 5,378,782 A | 1/1995 | Grootaert | |
| 5,639,837 A | 6/1997 | Farnham et al. | |
| 6,090,895 A | 7/2000 | Mao et al. | |
| 6,211,319 B1 | 4/2001 | Schmiegel | |
| 6,277,512 B1 | 8/2001 | Hamrock et al. | |
| 6,425,993 B1 | 7/2002 | Debe et al. | |
| 6,492,295 B2 * | 12/2002 | Hitomi et al. ............... | 502/159 |
| 6,624,328 B1 | 9/2003 | Guerra | |
| 6,639,011 B2 * | 10/2003 | Arcella et al. ............... | 524/835 |
| 6,649,295 B2 | 11/2003 | Hamrock et al. | |
| 6,803,435 B2 | 10/2004 | Coggio et al. | |
| 6,812,310 B2 * | 11/2004 | Grootaert et al. ........... | 526/253 |
| 6,825,300 B2 | 11/2004 | Grootaert et al. | |
| 6,833,412 B2 | 12/2004 | Hamrock et al. | |
| 6,838,545 B2 * | 1/2005 | Chapman et al. ............ | 528/480 |
| 6,896,996 B2 * | 5/2005 | Marchionni et al. ........ | 429/324 |
| 2004/0116742 A1 | 6/2004 | Guerra | |
| 2004/0121210 A1 | 6/2004 | Hamrock | |
| 2004/0167290 A1 * | 8/2004 | Grootaert et al. ......... | 525/326.2 |
| 2005/0131097 A1 * | 6/2005 | Jing et al. ..................... | 522/1 |
| 2005/0137351 A1 * | 6/2005 | Guerra .................... | 525/326.2 |

FOREIGN PATENT DOCUMENTS

| | | |
|---|---|---|
| EP | 1 172 382 A2 | 1/2002 |
| EP | 1 221 733 A2 | 7/2002 |
| EP | 1 323 751 A2 | 7/2003 |
| EP | 1 533 325 A1 | 5/2005 |
| GB | 1210794 | 10/1970 |
| WO | WO 01/46275 A1 | 6/2001 |

OTHER PUBLICATIONS

Dennis E. Curtin et al., "Advanced Materials for Improved PEMFC Performance and Life", *Journal of Power Sources*, vol. 131, 2004, pp. 41-48.

Shoibal Banerjee and Dennis E. Curtin, "Nafion® Perfluorinated Membranes in Fuel Cells", *Journal of Fluorine Chemistry*, vol. 125, 2004, pp. 1211-1216.

U.S. Appl. No. 10/712,590, filed Nov. 13, 2003, entitled "Bromine Chlorine or Iodine Functional Polymer Electrolytes Crosslinked by E-Beam".

U.S. Appl. No. 10/697,768, filed Oct. 30, 2003, entitled "Aqueous Emulsion Polymerization of Functionalized Fluoromonomers".

* cited by examiner

*Primary Examiner*—Duane Smith
*Assistant Examiner*—Ives Wu
(74) *Attorney, Agent, or Firm*—Philip Y. Dahl

(57) ABSTRACT

The present invention is a fluoropolymer comprising a plurality of pendent groups terminating in —$CF_2SO_3X$, —$CF_2SO_2F$, or combinations thereof, where X is selected from a group consisting of $H^+$ and a monovalent cation, and at least one —$CF_2Y$ end group, where Y is selected from a group consisting of a chlorine atom, a bromine atom, an iodine atom, a nitrile group, and an —$SO_3X$ group.

4 Claims, No Drawings

FLUORINATED IONOMERS WITH REDUCED AMOUNTS OF CARBONYL END GROUPS

FIELD OF THE INVENTION

The present invention relates to fluoropolymers suitable for use as electrolyte membranes in electrochemical devices. In particular, the present invention relates to fluoropolymers and fluorinated ionomers that have reduced amounts of carbonyl end groups.

BACKGROUND OF THE INVENTION

Fuel cells are electrochemical devices that produce usable electricity by the catalyzed combination of a fuel such as hydrogen and an oxidant such as oxygen. In contrast to conventional power plants, such as internal combustion generators, fuel cells do not utilize combustion. As such, fuel cells produce little hazardous effluent. Fuel cells convert hydrogen fuel and oxygen directly into electricity, and can be operated at higher efficiencies compared to internal combustion generators.

A fuel cell such as a proton exchange membrane (PEM) fuel cell typically contains a membrane electrode assembly, which consists of a catalyst coated membrane disposed between a pair of gas diffusion layers. The catalyst coated membrane itself typically includes an electrolyte membrane disposed between a pair of catalyst layers. The respective sides of the electrolyte membrane are referred to as an anode portion and a cathode portion. In a typical PEM fuel cell, hydrogen fuel is introduced into the anode portion, where the hydrogen reacts and separates into protons and electrons. The electrolyte membrane transports the protons to the cathode portion, while allowing a current of electrons to flow through an external circuit to the cathode portion to provide power. Oxygen is introduced into the cathode portion and reacts with the protons and electrons to form water and heat.

Another type of electrochemical device is an electrolysis cell, which uses electricity to produce chemical changes or chemical energy. An example of an electrolysis cell is a chlor-alkali membrane cell where aqueous sodium chloride is electrolyzed by an electric current between an anode and a cathode. The electrolyte is separated into an anolyte portion and a catholyte portion by a membrane subject to harsh conditions. In chlor-alkali membrane cells, caustic sodium hydroxide collects in the catholyte portion, hydrogen gas is evolved at the cathode portion, and chlorine gas is evolved from the sodium chloride-rich anolyte portion at the anode.

Due to their ionic properties, fluorinated ionomers are suitable for forming electrolyte membranes in fuel cells, electrolysis cells, and other electrochemical devices. Fluorinated ionomers are typically prepared by free-radical polymerization of fluorinated ionic monomers or precursors. The free-radical polymerization, however, also produces carbonyl end groups (e.g., —COOH end groups, —COO⁻ end groups, —COF end groups, and —CONH$_2$ end groups) on the resulting fluorinated ionomers. The carbonyl end groups are vulnerable to peroxide radical attacks, which reduce the oxidative stability of the fluorinated ionomers. During operation of a fuel cell, electrolysis cell, or other electrochemical cell, peroxides can be formed. This degrades the fluorinated ionomers, and correspondingly reduces the operational life of the given electrolyte membrane.

BRIEF SUMMARY OF THE INVENTION

The present invention relates to a fluoropolymer comprising a plurality of pendent groups terminating in —CF$_2$SO$_3$X, —CF$_2$SO$_2$F, or combinations thereof, and at least one —CF$_2$Y end group. X is selected from a group consisting of H⁺ and a cation. Y is selected from a group consisting of a chlorine atom, a bromine atom, an iodine atom, a nitrile group, and an —SO$_3$X group. The fluoropolymer exhibits increased oxidative stability and is suitable for forming electrolyte membranes for electrochemical devices.

The present invention further relates to a method of making a fluoropolymer. The method comprises free-radical polymerizing fluorinated monomers in the presence of a salt, a pseudohalogen, or a combination of the salt and the pseudohalogen, to make the fluoropolymer. The fluoropolymer comprises a plurality of pendent groups terminating in —CF$_2$SO$_3$X, —CF$_2$SO$_2$F, or combinations thereof, and at least one —CF$_2$Y end group. X is selected from a group consisting of H⁺ and a cation. Y is selected from a group consisting of a chlorine atom, a bromine atom, an iodine atom, a nitrile group, and an —SO$_3$X group.

The present invention further relates to a method of making a fluoropolymer, which comprises providing fluorinated monomers, where at least one of the fluorinated monomers comprises a group terminating in —CF$_2$SO$_2$F. The method further comprises free-radical reacting the fluorinated monomers in the presence of a salt, a pseudohalogen, or a combination of the salt and the pseudohalogen, to make the fluoropolymer, where the fluoropolymer has at least about 25% less carbonyl end groups relative to a similar fluoropolymer produced in the absence of the salt or the pseudohalogen.

DETAILED DESCRIPTION

The present invention is a fluoropolymer that contains a fluorinated backbone chain with a plurality of pendent groups, and at least one non-carbonyl end group. The non-carbonyl end group of the fluoropolymer is a —CF$_2$Y end group, where Y is a reactive atom or group, such as a chlorine atom, a bromine atom, an iodine atom, or a nitrile group. The —CF$_2$Y end group replaces a carbonyl end group, which would otherwise be present from the polymerization. Replacing the carbonyl end group with the —CF$_2$Y end group increases the oxidative stability of the fluoropolymer. The increased oxidative stability preserves the durability of the fluoropolymer, which correspondingly preserves the operational life of the given electrolyte membrane.

A particularly suitable composition for the fluoropolymer of the present invention has the —CF$_2$Y end groups being —CF$_2$Cl end groups (i.e., Y is a chlorine atom). The chlorine functionalities are stable and provide increased oxidative stability compared to carbonyl end groups.

The pendent groups of the fluoropolymer terminate in —CF$_2$SO$_3$X, —CF$_2$SO$_2$F, or combinations thereof, where X may be a hydrogen ion (H⁺) or a monovalent or multivalent cation (e.g., Li⁺). Pendent groups terminating in —CF$_2$SO$_3$X provide ionic conductivity to the fluoropolymer. As such, fluoropolymers of the present invention with pendent groups terminating in —CF$_2$SO$_3$X are fluorinated ionomers suitable for forming an electrolyte membrane. Pendent groups terminating in —CF$_2$SO$_2$F are non-ionic groups that may be subsequently hydrolyzed to form pendent groups that terminate in —CF$_2$SO$_3$X. As such, fluoropolymers of the present invention with pendent groups terminating in —$CF_2SO_2F$ may be precursors to fluorinated ionomers.

Suitable pendent groups for the fluoropolymer include groups having the formulas —$R^1$—$SO_3X$, —$R^1$—$SO_2F$, or combinations thereof, where $R^1$ may be a branched or unbranched perfluoroalkyl, perfluoroalkoxy, or perfluoroether group, which contains one to fifteen carbon atoms and zero to four oxygen atoms. Particularly suitable pendent groups for the fluoropolymer include —$O(CF_2)_4SO_3X$, —$O(CF_2)_4SO_2F$, —$OCF_2CF(CF_3)OCF_2CF_2SO_3X$, —$OCF_2CF(CF_3)OCF_2CF_2SO_2F$, and combinations The backbone chain of the fluoropolymer may be partially or fully fluorinated. Suitable fluorine concentrations in the backbone chain include about 40% or more by weight, based on the entire weight of the backbone chain. In one embodiment of the present invention, the backbone chain of the fluoropolymer is perfluorinated.

The fluoropolymer of the present invention may be produced by a free-radical polymerization of a polymerization mixture, followed by a hydrolyzation of the pendent groups to provide ionic pendent groups. The polymerization mixture contains fluorinated monomers, an initiator, and a salt, a pseudohalogen, or a combination of a salt and a pseudohalogen. The free-radical polymerization is initiated through the use of the initiator in the presence of the salt or the pseudohalogen. The fluorinated monomers polymerize to form the backbone chain and the pendent groups, where the pendent groups terminate in —$CF_2SO_2F$. In this state, the pendent groups are stable and are substantially unaffected by the salt or the pseudohalogen during the polymerization. The salt and the pseudohalogen reduce the amount of carbonyl end groups that form on the backbone chain, and replace the carbonyl end groups with —$CF_2Y$ end groups.

Examples of suitable concentration reductions of carbonyl end groups in the fluoropolymer of the present invention include at least about 25% fewer carbonyl end groups relative to a similar fluoropolymer produced in the absence of the salt or the pseudohalogen. Examples of particularly suitable concentration reductions of carbonyl end groups in the fluoropolymer of the present invention include at least about 50% fewer carbonyl end groups relative to a similar fluoropolymer produced in the absence of the salt or the pseudohalogen. This increases the oxidative stability of the fluoropolymer. The compositions of the end group may be determined using a variety of analytical techniques. Examples of suitable analytical techniques include infrared detection (see, e.g., Grootaert et al., U.S. Pat. No. 6,825,300) and F-NMR detection (see, e.g., Buckmaster et al., U.S. Pat. No. 4,742,122 and Schreyer, U.S. Pat. No. 3,085,083).

Suitable salts for use with the present invention include those having the formula MeY, where Me is a monovalent or multivalent cation, and Y is a reactive atom or group, as discussed above (i.e., a chloride anion, a bromide anion, an iodide anion, or a cyanide anion). Suitable cations of the salt include sodium, potassium, and ammonium. The salt used in the free-radical polymerization may be a homogenous salt or a blend of different salts.

Suitable pseudohalogens for use with the present invention include pseudohalogen nitrile-containing compounds, which provide nitrile end groups (i.e., Y is a nitrile group). Pseudohalogen nitrile-containing compounds have one or more nitrile groups and function in the same manner as compounds in which the nitrile groups are replaced with a halogen. Examples of suitable pseudohalogen nitrile-containing compounds include NC—CN, NC—S—S—CN, NC—Se—Se—CN, NCS—CN, NCSe—CN, Cl—CN, Br—CN, I—CN, NCN═NCN, and combinations thereof.

During the free-radical polymerization, the reactive atoms/groups of the salts or the nitrile groups of the pseudohalogens chemically bond to at least one end of the backbone chain of the fluoropolymer. This provides the "Y" atoms or groups, of the $CF_2Y$ end groups instead of carbonyl end groups. For example, if the free-radical polymerization is performed in the presence of a KCl salt, at least one of the end groups provided would be a —$CF_2Cl$ end group. Alternatively, if the free-radical polymerization is performed in the presence of a NC—CN pseudohalogen, at least one of the end groups provided would be a —$CF_2CN$ end group.

The amount of the salt or pseudohalogen used may be selected relative to the amount of the initiator used. Generally, the concentration of —$CF_2Y$ end groups on the fluoropolymer increases with the concentration ratio of the salt/pseudohalogen relative to the initiator. Correspondingly, the concentration of carbonyl end groups on the fluoropolymer decreases with the concentration ratio of the salt/pseudohalogen relative to the initiator. Suitable molar ratios of reactive atoms/groups of the salt/pseudohalogen relative to the initiator range from between about 1/0.1 to about 0.1/10, with particularly suitable molar ratios ranging from between about 1/0.5 to about 0.1/5.

Suitable initiators for use in the free-radical polymerization include peroxides, persulfates, percarbonates, esters, manganese-containing initiators, cerium-containing initiators, and combinations thereof. Additional examples of suitable initiators include initiator systems that generate free radicals through a redox reaction, such as a combination of an oxidizing agent and a reducing agent. Suitable oxidizing agents include persulfates, such as ammonium persulfate (APS), potassium persulfate (KPS), sodium persulfate, and combinations thereof. Additional suitable oxidizing agents include compounds containing chlorate ions, hypochlorite ions, bromate ions, and combinations thereof. Suitable reducing agents include sulfites, such as sodium sulfite, sodium bisulfite, metabisulfite (e.g., sodium and potassium bisulfite), pyrosulfites, thiosulfates, and combinations thereof. Examples of suitable redox systems for use as initiators include a combination of peroxodisulphate and hydrogen sulphite or disulphite, a combination of thiosulphate and peroxodisulphate, a combination of peroxodisulphate and hydrazine or azodicarboxamide, and a combination of peroxodisulphite and sodium chloride. Suitable concentrations of the initiator in the polymerization mixture range from about 0.01% to about 3.0%, by weight, with particularly suitable concentrations ranging from about 0.05% to about 2.0%, by weight, based on the entire weight of the polymerization mixture.

The fluorinated monomers used to form the fluoropolymer include at least one sulfonyl fluoride monomer and at least one perfluorinated comonomer. Preferably, the fluorinated monomers include a plurality of sulfonyl fluoride monomers and a plurality of perfluorinated comonomers. The fluorinated monomers may also include non-perfluorinated monomers such as vinylidene fluoride (VDF), trifluoroethylene, ethylene, propylene, and combinations thereof.

Suitable sulfonyl fluoride monomers include fluorinated monomers having the formula $F_2C$═$CF$—$R^2$—$SO_2F$, where $R^2$ may be a branched or unbranched perfluoroalkyl, perfluoroalkoxy, or perfluoroether group, which contains one to fifteen carbon atoms and zero to four oxygen atoms. Particularly suitable sulfonyl fluoride monomers include $F_2C$═$CFO(CF_2)_4SO_2F$, $F_2C$═$CFOCF_2CF(CF_3)OCF_2CF_2SO_2F$, and combinations thereof. The sulfonyl fluoride monomers may be synthesized by any suitable means, including methods disclosed in Guerra, U.S. Pat. No. 6,624,328. The $R^2$—$SO_2F$ groups of the sulfonyl fluoride monomers generally define the pendent groups of the resulting fluoropolymer after the polymerization.

Suitable perfluorinated comonomers include fluorinated monomers having the formula $F_2C=CF-R^3$, where $R^3$ may be a fluorine atom, or a branched or unbranched perfluoroalkyl, perfluoroalkoxy, or perfluoroether group, which contains one to five carbon atoms and zero to two oxygen atoms. Examples of suitable perfluorinated comonomers include tetrafluoroethylene (TFE), hexafluoropropylene (HFP), perfluoroethylvinyl ether (PMVE), and combinations thereof. A particularly suitable perfluorinated comonomer is TFE.

The polymerization mixture may also contain additional components, such as buffers, chain-transfer agents, stabilizers, processing aids, and combinations thereof. Chain-transfer agents, such as gaseous hydrocarbon chain-transfer agents, may be used to adjust the molecular weight of the resulting fluoropolymer.

The polymerization mixture may also contain disulphites, such as sodium disulphite, which may be used with oxidizing agents (e.g. APS, chlorate ions, hypochlorite ions, and bromate ions) to provide —$CF_2SO_3X$ end groups on the backbone chain. As such, another suitable reactive group for "Y" of the —$CF_2Y$ end group includes an —$SO_3X$ group. After free-radical polymerizing a polymerization mixture with that includes one or more disulphites and one or more oxidizing agents, the fluoropolymer of the present invention may have at least one end group that is an —$CF_2SO_3H$ end group. The —$CF_2SO_3H$ end group may then be post-fluorinated to provide an —$CF_2SO_2F$ end group, which may be subsequently hydrolyzed to provide the ionic —$CF_2SO_3X$ end group. Accordingly, another particularly suitable composition for the fluoropolymer of the present invention has the —$CF_2Y$ end groups being —$CF_2SO_3X$ end groups (i.e., Y is an —$SO_3X$ group). The —$SO_3X$ functionalities are stable, provide increased oxidative stability compared to carbonyl end groups, and also provide additional ionic conductivity to the fluoropolymer.

The polymerization mixture may also contain fluoroalkylsulfinates and fluoroalkylsulfinic acids, which may also be used with oxidizing agents (e.g., APS, chlorate ions, hypochlorite ions, and bromate ions) to provide a fluoropolymer of the present invention that has at least one —$CF_3$ end group in addition to the —$CF_2Y$ end group. Suitable fluoroalkyl radicals of the fluoroalkylsulfinates and fluoroalkylsulfinic acids include fluoroaliphatic radicals and perfluoroaliphatic radicals, such as perfluorobutylsulfinate and perfluorobutylsulfinic acid. An example of a particularly suitable system for producing the fluoropolymer of the present invention includes an APS initiator, a KCl salt, and perfluorobutylsulfinic acid. The resulting fluoropolymer includes at least one —$CF_2Cl$ end group and at least one —$CF_3$ end group.

The free-radical polymerization may be carried out in a variety of manners, such as in an organic solvent, as an aqueous suspension polymerization, or as an aqueous emulsion polymerization. The free-radical polymerization may be carried out at any pH, temperature, and pressure suitable for a given initiator system. However, to avoid pre-hydrolyzing the —$SO_2F$ groups, the polymerization is desirably carried out in a pH range from about six to seven. Suitable temperatures for the polymerization range from about 10° C. to about 100° C. Suitable pressures for the polymerization range from about 300 kilopascals (KPa) to about 3,000 KPa. The polymerization is desirably carried out in an oxygen-free environment.

In one embodiment, the free-radical polymerization is carried out as an aqueous emulsion polymerization, which involves polymerizing the fluorinated monomers in the aqueous phase of an emulsion. The aqueous emulsion may be obtained in a variety of manners, such as with the use of ammonium perfluorooctanoic acid or salts thereof, or with the use of perfluoropolyethers. Alternatively, the aqueous emulsion polymerization may be performed by preparing a pre-emulsion of the sulfonyl fluoride monomers in water with a base.

In this latter alternative, suitable weight ratios of the water to the sulfonyl fluoride monomers in the pre-emulsion range from about 0.1/1 to about 1/0.01, with particularly suitable weight ratios ranging from about 0.2/1 to about 1/0.1. Any suitable base may be used, such as alkaline hydroxides (e.g., NaOH, KOH, and LiOH), earth alkaline hydroxides, hydroxides of Group III metals, $NH_4OH$, and combinations thereof. Suitable concentrations of the base in the pre-emulsion range from about 0.01 molar equivalents to about 0.5 molar equivalents, with particularly suitable concentrations ranging from about 0.02 molar equivalents to about 0.3 molar equivalents, where the molar equivalents are relative to the sulfonyl fluoride monomers in the pre-emulsion.

The pre-emulsion may be mixed in a conventional manner, such as with a homogenizer, a high speed agitator, a colloid mill mixer, or an ultrasonic device. Suitable mixing times range from about one minute to about sixty minutes, with particularly suitable mixing times ranging from about one minute to about twenty minutes.

Once the pre-emulsion is prepared, the polymerization ingredients (i.e., the pre-emulsion, the comonomers, the initiator, the salt/pseudohalogen, and any additional components) are charged to a reaction vessel to initiate the free-radical polymerization. The aqueous emulsion polymerization may be carried out in a continuous process, or in a batch or semi-batch process. A continuous process involves continuously feeding the ingredients to a stirred reaction vessel under optimum pressure and temperature conditions while the resulting emulsion is removed continuously. Batch or semi-batch processes involve feeding the ingredients into a stirred reaction vessel and allowing them to react at a set temperature for a specified length of time, or by charging ingredients into the reaction vessel and feeding the comonomers into the reactor to maintain a constant pressure until a desired amount of the fluoropolymer is formed. The polymerization may be carried out in a standard or conventional vessel used for emulsion polymerization of gaseous fluorinated monomers. The free-radical polymerization produces a fluoropolymer latex, where the fluoropolymers of the latex have pendent groups terminating in —$CF_2SO_2F$ and at least one —$CF_2Y$ end group. Preferably, a large number of the end groups of the fluoropolymer are —$CF_2Y$ end groups.

As discussed above, the pendent groups terminating in —$CF_2SO_2F$ may be hydrolyzed to form ionic pendent groups that terminate in —$CF_2SO_3X$. Hydrolyzation may be carried out in any conventional manner. For example, the fluoropolymer may initially be reacted with a base, such as LiOH, NaOH, KOH, or combinations thereof. The fluoropolymer may then be reacted with an acid or an ion exchange resin to provide —$CF_2SO_3X$, where X is based on the acid or ion exchange resin used. Accordingly, after the polymerization and hydrolyzation, the fluoropolymer is a fluorinated ionomer having pendent groups terminating in —$CF_2SO_2X$ and at least one —$CF_2Y$ end group. In this state, the fluoropolymer exhibits ionic conductivity for forming an electrolyte membrane for an electrochemical device. The hydrolyzation may also apply in the same manner to any $—CF_2SO_2F$ end groups formed on the backbone chain to form $—CF_2SO_3X$ end groups. Alternatively, the polymerized fluoropolymer may be extruded to form a membrane followed by subsequent hydrolyzation.

In an alternative embodiment of the present invention, the fluoropolymer may undergo a post-fluorination treatment to convert the $—CF_2Y$ end groups to $—CF_3$ end groups, which are very stable. The post-fluorination treatment is desirably carried out after the polymerization, but before the hydrolyzation to protect the pendent groups. The post-fluorination treatment may be performed in any conventional manner. For example, the fluoropolymer latex may be subjected to a fluorine and nitrogen gas mixture, where the gas mixture has a fluorine concentration of about 10% to about 25% by weight, based on the entire weight of the gas mixture. Suitable post-fluorination conditions include temperatures ranging from about 150° C. to about 250° C., pressures ranging from about 100 KPa to about 1,000 KPa, and reaction times ranging from about four hours to about sixteen hours. The fluoropolymer latex may also be agitated to continuously expose new surfaces to the gas mixture.

The fluoropolymers of the present invention are particularly suitable for post-fluorination treatments. The reactive atoms/groups "Y" of the $—CF_2Y$ end groups are reactive with the fluorine gas, which reduces the time and energy required to post-fluorinate the fluoropolymers. This is particularly true where the end group includes a reactive atoms/group that is somewhat less stable at elevated temperatures (e.g., above 280° C.), such as a bromine atom, an iodine atom, or a nitrile group. Such end groups are readily post-fluorinated to provide $—CF_3$ end groups. Fluoropolymers with end groups that are stable at elevated temperatures (e.g., above 280° C.), such as $—CF_2Cl$ end groups or $SO_3X$ end groups, may be used without a post-fluorination step, but are also suitable for post-fluorination if desired.

In contrast to the fluoropolymers of the present invention, post-fluorinating fluoropolymers with carbonyl end groups requires significant amounts of time and energy to convert the carbonyl end groups to $—CF_3$ end groups. Moreover, post-fluorinating fluoropolymers with carbonyl end groups may form $—COF$ end groups, which are undesirable because they may revert back to carboxylic acid end groups in the presence of water. The $—CF_2Y$ end groups, however, are effective sites for the post-fluorination treatment and do not revert back to carboxylic acid end groups in the presence of water.

After the post-fluorination treatment, a large number of the fluoropolymers have pendent groups terminating in $—CF_2SO_2F$ and at least one $—CF_3$ end group. Preferably, substantially all of the end groups of the fluoropolymer are $—CF_3$ end groups. The fluoropolymers may then be hydrolyzed, as discussed above, to form pendent groups terminating in $—CF_2SO_3X$, while also retaining $—CF_3$ end groups. The fluoropolymers then exhibit ionic conductivity while also having high levels of oxidative stability.

The fluoropolymer of the present invention may be formed into an electrolyte membrane by any suitable method, including casting, molding, extrusion, and the like. For example, an electrolyte membrane may be cast from a latex or suspension of the fluoropolymer and then dried, annealed, or both. This is particularly suitable where the fluoropolymers have been hydrolyzed and contain ionic pendent groups. In general, fluoropolymers with pendent groups terminating in $—CF_2SO_2F$ are easier to melt process (e.g., extrusion or hot pressing into various shapes, such as films or membranes) compared to fluoropolymers with pendent groups terminating in $—CF_2SO_3X$. As such, an alternative method of forming electrolyte membranes includes melt processing fluoropolymers with pendent groups terminating in $—CF_2SO_2F$ and then hydrolyzing the shaped membrane to render them ionic.

After being formed into a membrane, the fluoropolymers of the present invention may also be cross-linked using a variety of cross-linking techniques, such as photochemical, thermal, and electron-beam techniques. An example of a suitable cross-linking technique includes electron-beam cross-linking, which is performed by exposing the fluoropolymers to electron beam radiation. Suitable doses of electron beam radiation include at least about one megarad, with particularly suitable doses including at least about three megarads, with even more particularly suitable doses including at least about five megarads, and with most particularly suitable doses including at least about fifteen megarads. Any suitable apparatus may be used to provide the electron beam radiation. An example of a suitable apparatus includes a trade designated "Energy Sciences CB300" e-beam system, which is commercially available from Energy Sciences, Inc. Wilmington, Mass.

The cross-linking may also be performed in the presence of one or more cross-linking agents. Suitable cross-linking agents for use with the fluoropolymers of the present invention include multifunctional compounds, such as multifunctional alkenes and other unsaturated cross-linkers. The cross-linking agents may be non-fluorinated, fluorinated to a low level, highly fluorinated, or more preferably, perfluorinated. The cross-linking agents may introduced to the fluoropolymer by any conventional manner. A suitable technique for introducing the cross-linking agent includes blending the cross-linking agent with the fluoropolymer before forming the fluoropolymer into a membrane. Alternatively, the cross-linking agent may be applied to the fluoropolymer membrane, such as by immersing the fluoropolymer membrane in a solution of the cross-linking agent.

Suitable thicknesses for fuel cell membranes formed from the fluoropolymer of the present invention include thicknesses of less than about ninety micrometers, with particularly suitable thicknesses of less than about sixty micrometers, and with even more particularly suitable thicknesses of less than about thirty micrometers Suitable thicknesses for membranes formed from the fluoropolymer of the present invention for use in electrolysis applications include thicknesses ranging from about 100 micrometers to about 300 micrometers. Such membranes may be produced via extrusion processes.

Although the present invention has been described with reference to preferred embodiments, workers skilled in the art will recognize that changes may be made in form and detail without departing from the spirit and scope of the invention.

EXAMPLE

The present invention is more particularly described in the following example, which is intended as an illustration only, since numerous modifications and variations within the scope of the present invention will be apparent to those skilled in the art. Unless otherwise noted, all parts, percentages, and ratios reported in the following example are on a weight basis, and all reagents used in the examples were obtained, or are available, from Aldrich Chemical Company, Milwaukee, Wis., or may be synthesized by conventional techniques. The following compositional abbreviations are used in the following example:

"MV4S": A sulfonyl fluoride monomer having the formula $CF_2$=$CFO(CF_2)_4SO_2F$, and a molecular weight of 378.11.

"TFE": A gaseous tetrafluoroethylene comonomer having the formula $CF_2$=$CF_2$, and a molecular weight of 100.02.

"LiOH.$H_2$O": Lithium hydroxide monohydrate, having a molecular weight of 41.97.

"APS": Ammonium peroxodisulfate initiator.

"KCl": Potassium chloride salt.

"Sodium disulfite": Sodium disulfite having a formula $NaS_2O_5$.

A first pre-emulsion was prepared by emulsifying 153 grams of MV4S in 170 grams of deionized water with the addition of 4 grams of LiOH.$H_2$O. The emulsification was carried out under high shear (24,000 rpm) for two minutes using a disperser commercially available from IKA-Werke GmbH & Co. KG, Staufen, Germany under the trade designation "ULTRA-TURRAX" Model T 25 disperser S25KV-25F.

A second pre-emulsion was prepared by emulsifying 423 grams of MV4S in 473 grams of deionized water with the addition of 11 grams of LiOH.$H_2$O. The emulsification was also carried out under high shear (24,000 rpm) for two minutes using the disperser.

A 4-liter, oxygen-free polymerization kettle equipped with an impeller agitator system was charged with 2.8 liters of deionized water and 50 grams of KCl. The kettle was heated up to 60° C. and then the first pre-emulsion was charged into the kettle. At 60° C. the kettle was further charged with 172 grams of TFE to an absolute reaction pressure of 800 kilopascals (KPa). The free-radical reaction was initiated by adding an initiator solution to the kettle, where the initiator solution contained 5 grams of sodium disulfite and 6 grams of APS, both dissolved in 30 milliliters of deionized water.

During the course of the reaction, the agitator was operated at 240 rpm, the reaction temperature was maintained at 60° C., and the reaction pressure was maintained at 800 KPa absolute. 800 grams of TFE and 905 grams of the second pre-emulsion were then fed to the kettle over a period of 331 minutes. The monomer valve was then closed and the monomer feed interrupted. The continuing polymerization reduced the pressure of the monomer gas phase to 300 KPa. At that time, the kettle was vented and flushed with nitrogen gas.

The resulting fluoropolymer latex had a solids content of 32% by weight, which was freeze coagulated at −18° C. The freeze coagulated fluoropolymer was then dried at 130° C. $^{19}$F-NMR analysis showed a composition of 88.4 mol % TFE, 11.6 mol % MV4S in the fluoropolymer. $^{19}$F-NMR analysis also showed a composition of 2.7 mol % $CF_2Cl$ in the backbone chain. The peak sequence of the $CF_2Cl$ had a chemical shift ranging between −77.5 parts-per-million (ppm) to −66.2 ppm. Elementary analysis showed a chlorine concentration in the fluoropolymer latex of 0.94% by weight, which is in accordance with the $^{19}$F-NMR analysis results. As such, the free-radical polymerization provided $CF_2Cl$ end groups on the backbone chains of the resulting fluoropolymers. The MV4S concentration results show that the resulting fluoropolymers had pendent groups terminating in —$CF_2SO_2F$.

The invention claimed is:

1. An electrolyte membrane comprising fluoropolymers, wherein each of the fluoropolymers comprises:
    a plurality of pendent groups terminating in —$CF_2SO_3X$, wherein X is selected from a group consisting of $H^+$ and a cation; and
    at least one —$CF_2Y$ end group, wherein Y is selected from a group consisting of a chlorine atom and an —$SO_3X$ group;
wherein each of the fluoropolymers further comprise at least one —$CF_3$ end group.

2. An electrochemical device comprising the electrolyte membrane of claim 1.

3. The electrolyte membrane of claim 1, wherein the fluoropolymers have at least about 25% fewer carbonyl end groups relative to similar fluoropolymers produced in the absence of a salt or a pseudohalogen.

4. An electrochemical device comprising the electrolyte membrane of claim 3.

* * * * *

UNITED STATES PATENT AND TRADEMARK OFFICE
CERTIFICATE OF CORRECTION

PATENT NO. : 7,214,740 B2  Page 1 of 1
APPLICATION NO. : 11/120822
DATED : May 8, 2007
INVENTOR(S) : Kai H. Lochhaas It is certified that error appears in the above-identified patent and that said Letters Patent is hereby corrected as shown below:

<u>Title Page, Col. 2, under (Other Publications)</u>
Line 7, after "Bromine" insert -- , --.

<u>Col. 3</u>
Line 12, after "combinations" insert -- thereof. --.

<u>Col. 4</u>
Line 7, delete "groups," and insert -- groups --, therefor.
Line 7, delete "CF$_2$Y" and insert -- —CF$_2$Y --, therefor.

<u>Col. 9</u>
Line 8, delete "LiOH.H$_2$O" and insert -- LiOH•H$_2$O --, therefor.
Line 16, delete "LiOH.H$_2$O." and insert -- LiOH•H$_2$O. --, therefor.
Line 24, delete "LiOH.H$_2$O." and insert -- LiOH•H$_2$O. --, therefor.

Signed and Sealed this

Fourteenth Day of August, 2007

JON W. DUDAS
*Director of the United States Patent and Trademark Office*